United States Patent
Kosiorek et al.

(10) Patent No.: US 7,171,332 B2
(45) Date of Patent: Jan. 30, 2007

(54) METHOD OF ASSESSING A SURFACE OF A FUEL INJECTOR ASSEMBLY

(75) Inventors: Roman Francis Kosiorek, Grand Rapids, MI (US); Caley Roarke Edgerly, Trufant, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/978,771

(22) Filed: Nov. 1, 2004

(65) Prior Publication Data

US 2006/0106569 A1    May 18, 2006

(51) Int. Cl.
*G01B 11/00*    (2006.01)
(52) U.S. Cl. .................. 702/166; 702/81; 702/82; 382/108
(58) Field of Classification Search ................ 702/166, 702/51, 81–82; 382/108
See application file for complete search history.

(56) References Cited

U.S. PATENT DOCUMENTS

| | | | |
|---|---|---|---|
| 4,571,695 A * | 2/1986 | Elton et al. ................. 702/167 |
| 4,576,482 A | 3/1986 | Pryor | |
| 4,888,983 A | 12/1989 | Dunfield et al. | |
| 5,010,224 A * | 4/1991 | Shirey et al. ............. 219/69.17 |
| 5,112,131 A | 5/1992 | Pryor | |
| 5,481,483 A | 1/1996 | Ebenstein | |
| 5,774,374 A * | 6/1998 | Scott et al. .................. 702/155 |
| 5,815,593 A * | 9/1998 | Shaum et al. ................ 382/154 |
| 6,714,307 B2 | 3/2004 | De Groot et al. | |
| 2003/0011784 A1 | 1/2003 | De Groot et al. | |
| 2003/0024911 A1 | 2/2003 | Horsting et al. | |
| 2003/0038948 A1 | 2/2003 | Prinzhausen et al. | |
| 2004/0025577 A1 | 2/2004 | Ananda et al. | |
| 2004/0080757 A1 | 4/2004 | Stanke et al. | |

FOREIGN PATENT DOCUMENTS

| | | | |
|---|---|---|---|
| JP | 03287366 A | * | 12/1991 |
| JP | 9-189540 | | 7/1997 |
| JP | 2002-303514 | | 10/2002 |

* cited by examiner

*Primary Examiner*—John Barlow
*Assistant Examiner*—Jonathan Moffat
(74) *Attorney, Agent, or Firm*—Brooks Kushman P.C.

(57) ABSTRACT

A method of assessing a profile of a surface of a fuel injector assembly. The method includes the steps of measuring the surface to obtain a set of data points, selecting a subset of the set of data points, fitting a regression line to the subset, establishing a tolerance limit for the regression line, and determining whether the data points are within the tolerance limits.

20 Claims, 3 Drawing Sheets

METHOD OF ASSESSING A SURFACE OF A FUEL INJECTOR ASSEMBLY

BACKGROUND OF THE INVENTION

1. Field of the Invention

The present invention relates to a method of assessing surface quality, and more particularly to a method of assessing the quality of a surface of a fuel injector assembly proximate a valve sealing area.

2. Background Art

Fuel injection systems are used to provide fuel to an engine of a motor vehicle. A fuel injection system includes one or more fuel injector assemblies. A fuel injector assembly includes one or more valves for controlling the injection of fuel. The valve is configured to permit the injection of fuel when closed and seal against a mating surface of the fuel injector assembly to inhibit fuel injection when open. Defects along or near the mating surface such as pitting, chipping, or erosion, may result in undesirable fuel leakage and degrade the performance of the fuel injector assembly.

Previously, visual inspection was used to assess surface attributes of a fuel injector assembly. More specifically, the mating surface of the fuel injector assembly was magnified under 50× magnification and visually inspected for surface defects. Such visual inspections were problematic since they involved subjective assessments of surface quality. In particular, subjective assessments resulted in the improper rejection of acceptable fuel injector assemblies and acceptance of defective fuel injector assemblies. Such improper rejections reduced process yields and increased manufacturing and warranty costs.

Before applicant's invention, an improved method of assessing the quality of a surface of fuel injector assembly was needed. Moreover, a method of assessing surface quality near a sealing surface without subjective visual assessments was needed. In addition, a method that could accurately assess the quality of one or more fuel injector surfaces having tight surface finish tolerances was needed. In addition, a method that could quickly and accurately assess surface quality in a small area without deforming or damaging the surface was needed. In addition, a method that was compatible with a high-volume fuel injector manufacturing system was needed to improve manufacturing process efficiency. Problems addressed with the prior art as noted above and other problems are addressed by applicant's invention as summarized below.

SUMMARY OF THE INVENTION

According to one aspect of the present invention, a method of assessing a profile of a surface of a fuel injector assembly is provided. The method includes measuring a height of the surface over the predetermined distance with a surface profiling instrument to obtain a set of data points, selecting a subset of the set of data points, fitting a regression line to the subset, establishing a tolerance range for the regression line, and determining whether all member of the subset are within the tolerance range.

The surface may be a seat surface or a valve bore surface of the fuel injector assembly. The seat surface is contacted by a valve of the fuel injector assembly when in a second position.

The method may include the step of generating an acceptance signal if all members of the subset are within the tolerance range or generating a reject signal if any member of the subset is outside the tolerance range.

According to another aspect of the present invention, a method of assessing a surface profile of a fuel injector assembly is provided. The fuel injector assembly includes a valve bore and a valve. The valve bore includes a valve bore surface and a seat surface disposed proximate the valve bore surface. The valve is disposed within the valve bore and contacts the seat surface when in a first position and is spaced apart from the seat surface when in a second position.

The method includes the steps of measuring a height of the seat surface over a first predetermined distance with a surface profiling instrument to obtain a first set of data points, measuring a height of the valve bore surface over a second predetermined distance with the surface profiling instrument to obtain a second set of data points, selecting a first subset from the first set of data points, selecting a second subset from the second set of data points, fitting a first regression line to the first subset, fitting a second regression line to the second subset, establishing a first tolerance range for the first regression line, establishing a second tolerance range for the second regression line, determining whether the first subset is within the first tolerance range, and determining whether the second subset is within the second tolerance range.

The first set of data points may include a plurality of sequential data points measured along the seat surface in a first direction extending perpendicular to a boundary formed where the seat surface and the valve bore surface intersect. The second set of data points may include a plurality of sequential data points measured along the valve bore surface in a second direction extending perpendicular to the boundary.

The first subset may include data points positioned at least a first distance away from the boundary. The second subset may include data points positioned at least a second distance away from the boundary. The first and second subsets may include a same or different number of data points.

According to another aspect of the present invention, a method of predicting valve leakage in a fuel injector assembly is provided. The fuel injector assembly includes a valve bore and a valve. The valve bore includes a valve bore surface and a seat surface disposed proximate the valve bore surface. The valve is disposed in the valve bore and contacts the seat surface when in a first position and is spaced apart from the seat surface when in a second position. The valve bore surface and seat surface define a boundary where they intersect.

The method includes the steps of measuring the seat surface over a first predetermined distance with a surface profiling instrument to obtain a first set of data points, measuring the valve bore surface over a second predetermined distance to obtain a second set of data points, selecting first and second subsets from the first and second sets of data points, fitting first and second regression lines to the first and second subsets, establishing a first tolerance range for the first regression line, selecting a plurality of sequential data points from the first set of data points, determining whether the plurality of sequential data points are within the first tolerance range, and generating a signal indicative of valve leakage if any member of the plurality of sequential data points is outside the first tolerance range.

The method may also include the steps of establishing a second tolerance range for the second regression line, selecting a second plurality of sequential data points from the second set of data points, determining whether the second plurality of sequential data points are within the second tolerance range, and generating a signal indicative of valve leakage if any member of the second plurality of sequential data points is outside the second tolerance range.

DETAILED DESCRIPTION OF THE PREFERRED EMBODIMENT(S)

Figure 1:
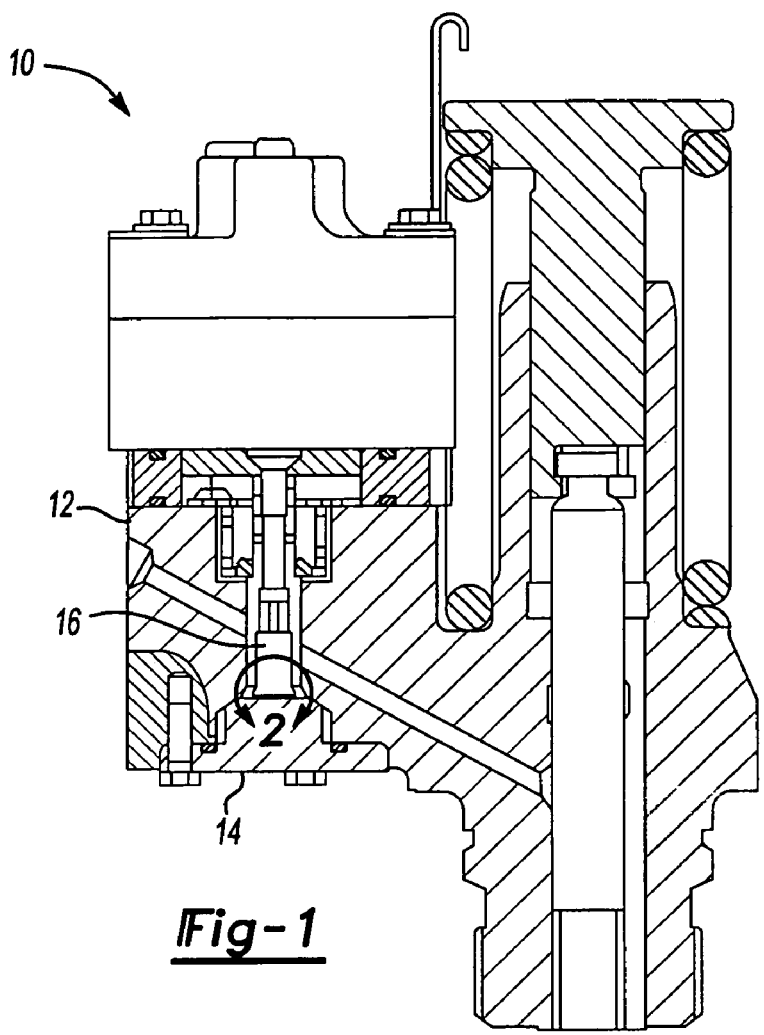
FIG. 1 is a section view of a fuel injector assembly.

Referring to FIG. 1, a section view of a fuel injector assembly 10 is shown. The fuel injector assembly 10 is part of a fuel injection system that provides fuel to an internal combustion engine. More specifically, the fuel injector assembly 10 sprays pressurized fuel through a nozzle in a predetermined pattern and into an air intake passage or a cylinder of the engine. The spraying action of the fuel injector assembly 10 atomizes the fuel, allowing it to better mix with air to facilitate combustion. In the embodiment shown in FIG. 1, the fuel injector assembly 10 includes a body 12, a valve stop 14, and a valve 16.

Figure 2:
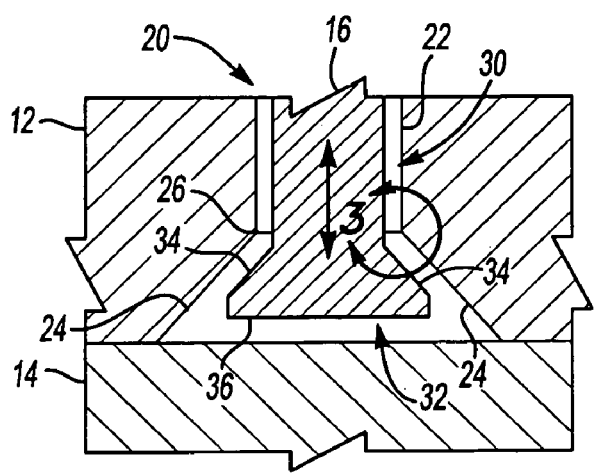
FIG. 2 is a magnified view of the fuel injector assembly shown in FIG. 1.

Referring to FIGS. 1 and 2, the body 12 is shown in more detail. The body 12 includes a valve bore 20 that is adapted to receive the valve 16 and permit the valve 16 to move between a first position and a second position as will be discussed in more detail below. The valve bore 20 may have any suitable configuration that is compatible with the valve 16. In the embodiment shown, the valve bore 20 includes a valve bore surface 22 and a seat surface 24. The valve bore surface 22 has a generally cylindrical configuration. The seat surface 24 is disposed proximate the valve bore surface 22 and is depicted as a chamfer having a tapered conical configuration. The seat surface 24 is tapered such that a first end disposed proximate the valve stop 14 has a larger diameter than a second end disposed proximate the valve bore surface 22. The valve bore surface 22 intersects the seat surface 24 at a boundary 26.

The valve stop 14 is disposed proximate the body 12 and configured to limit movement of valve 16. The valve stop 14 may be attached to the body 12 in any suitable manner, such as with one or more fasteners.

The valve 16 may have any suitable configuration. In the embodiment shown, the valve 16 is configured as a poppet valve and includes a valve stem 30 and a valve head 32.

The valve stem 30 is at least partially disposed in the valve bore 20. In the embodiment shown, the valve stem 30 has a generally cylindrical configuration and is spaced apart from the valve bore 20. The valve stem 30 may be coupled to an actuator, such as a solenoid or spring, that actuates the valve 16 between the first and second positions in the direction shown by the arrowed line in FIG. 2.

The valve head 32 is disposed proximate the valve stem 30. The valve head 32 includes a valve face surface 34 and an end surface 36 disposed proximate the valve face surface 34. The valve face surface 34 may have any suitable configuration that is compatible with the seat surface 24. In the embodiment shown, the valve face surface 34 has a tapered conical configuration similar to the seat surface 24.

More specifically, the valve face surface 34 has a larger diameter at an end disposed adjacent to the end surface 36 than at an end disposed proximate the valve stem 30.

The valve 16 is adapted to move between a first position in which pressurized fuel circulates within the fuel injector assembly 10 (i.e., fuel is not injected), and a second position in which the pressurized fuel is permitted to flow toward the nozzle (i.e., fuel is injected). The valve 16 is in the first position when the valve face surface 34 is disposed adjacent to the seat surface 24 and the end surface 36 is spaced apart from the valve stop 14. The valve 16 is in the second position when the valve face surface 34 is spaced apart from the seat surface 24. In addition, the end surface 36 may contact the valve stop 14 when the valve 16 is in the second position.

Figure 3:
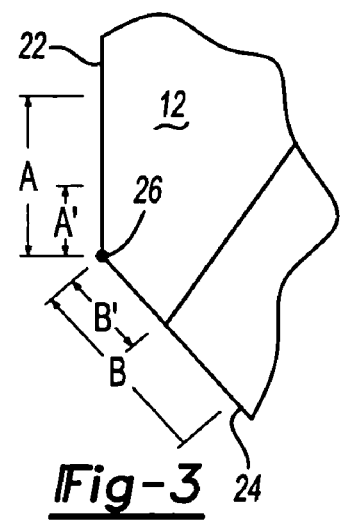
FIG. 3 is a magnified view of a body of the fuel injector assembly shown in FIG. 2.

Referring to FIG. 3, a portion of the valve bore 20 disposed near the boundary 26 is shown in greater detail. In this figure, the valve 16 is not shown for clarity. Surface defects on the valve bore surface 22 and/or seat surface 24 near the boundary 26 may result in improper valve sealing and degrade the performance of the fuel injector assembly 10. For instance, surface defects in this region may result in reduced pumping efficiency and/or low fuel injector output. As a result, this region is generally machined to precise dimensional tolerances. In the text below, distances A and A' are measured along the valve bore surface 22 from the boundary 26. Similarly, distances B and B' are measured along the seat surface 24 from the boundary 26.

Figure 4:
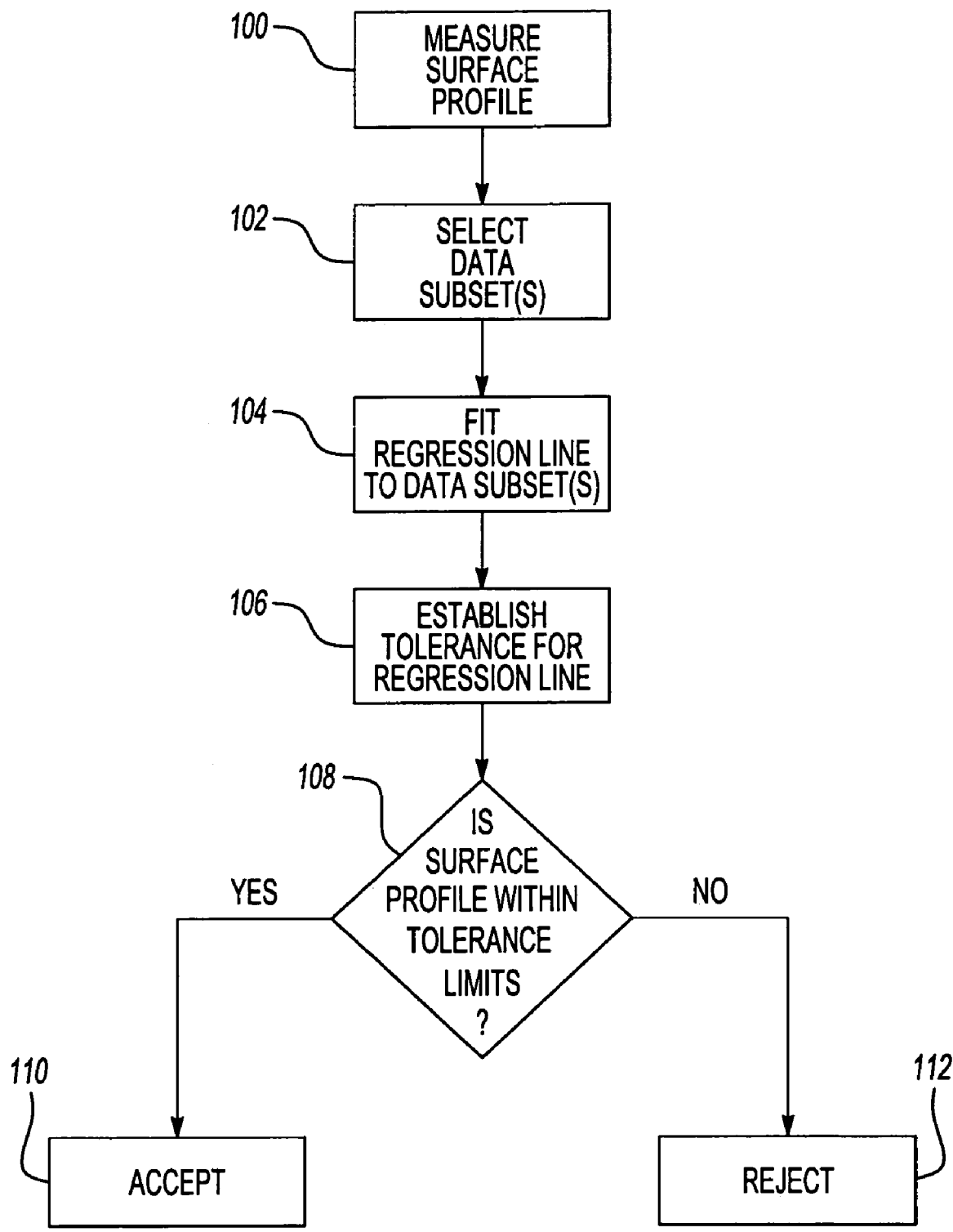
FIG. 4 is a flowchart of a method of assessing a surface profile of the fuel injector assembly.

Referring to FIG. 4, a flowchart of a method of assessing the profile of a surface of the fuel injector assembly 10 is shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins by measuring one or more surfaces of the fuel injector assembly with a surface profiling instrument. The surface profiling instrument may be of any suitable type, such as a contact or non-contact profilometer. For example, an SmartScope Zip 250 optical profilometer manufactured by Optical Gauging Products equipped with a DRS-500 laser may be employed.

The surface profiling instrument measures the height of at least one target surface over a predetermined distance, also called a traverse length. More specifically, the surface profiling instrument gathers a set of sequential data points indicative of the profile a surface in a digitized form. For example, one set of data points may be gathered along the valve bore surface over distance A and another set of data points may be gathered along the seat surface over distance B. In the embodiment shown, distances A and B extend perpendicular to the boundary 26 along the valve bore surface and the seat surface, respectively. Distances A and B may be of any suitable length. For instance, distance B may be greater than distance A so that a larger sample of data points is available to more accurately assess the surface profile attributes of the seat surface and potential sealing integrity. In one embodiment, distance A is at least 0.2 mm and distance B is at least 0.8 mm.

The traverse length may be any suitable distance and may be based on quantitative analysis or experimentation. For example, a traverse distance of between 0.2 mm and 1.0 mm may be employed.

At 102, a subset of data points is selected from each set of sequential data points. A subset of data points may be selected such that data at one or more ends of the traverse length is not included. For example, the data points gathered along distance A' of the valve bore surface may be omitted when selecting a subset of the set of valve bore surface data points. Similarly, the data points gathered along distance B' of the seat surface may be omitted when selecting a subset of the set of seat surface data points. The data points over distances A' and B' are more likely to have a slope or profile that is not representative of the valve bore surface and seat surface, respectively. As such, these data points may be omitted to eliminate "noise" so that the subsequent data analysis steps do not yield inappropriately biased results. Distances A' and B' may be any suitable values and may be selected based on quantitative analysis or experimentation. For example, distance A' may be between 0.005 to 0.015 mm away from the boundary. Similarly, distance B' may be between 0.1 to 0.4 mm away from the boundary.

At 104, a regression line is fit to the subset of valve bore surface data points and/or to the subset of seat surface data points. More specifically, a least squares regression analysis may be performed to generate a least squares regression line for the data in a manner known by those skilled in the art.

At 106, a tolerance limit is established about the regression line. More specifically, unilateral or bilateral tolerance limits are established relative to the regression line generated for the subset of valve bore surface data points and/or regression line generated for the subset of seat surface data points. A unilateral tolerance limit may be depicted as a line that has the same slope as its associated regression line, but is offset from the regression line by a predetermined amount. Similarly, bilateral tolerances limits may be established by creating two parallel tolerance lines that have the same slope as an associated regression line and are offset from the regression line by a predetermined amount. The predetermined offset amounts for unilateral or bilateral tolerance limits may be any suitable amount. For instance, an offset amount of 5 microns may be employed to indicate fuel injector assemblies with the desired performance characteristics.

At 108, the surface profile data points are compared to associated tolerance limits. For example, the members of the subset of valve bore surface data points are compared to their respective tolerance limits to assess the quality of the valve bore surface. Similarly, the members of the subset of seat surface data points may be compared to their respective tolerance limits to assess the quality of the seat surface. Comparisons may be made using a subset of a set of data points due to the potentially non-representative data that may be disposed adjacent to the boundary as previously described. Alternatively, the regression line for the valve bore surface may be used to "position" and select a subset or range of seat surface data points. More particularly, the data points for the valve bore surface and seat surface may be plotted versus each other with their corresponding regression lines and tolerance limits. Since the valve bore surface and seat surface are disposed at an angle relative to each other, the regression lines for these surfaces will intersect when plotted in a corresponding relationship. Moreover, since the regression lines will intersect, their respective tolerance lines will also intersect. The seat surface data points that are located within the valve bore surface tolerance limits may be ignored and the remaining seat surface data points may be compared to the seat surface regression line tolerance limits. If all members of the subset are within the tolerance zone indicated by the tolerance lines, then the part is accepted at block 110. If all members of the subset are not within the tolerance zone, then the part is rejected at block 112.

Figure 5:
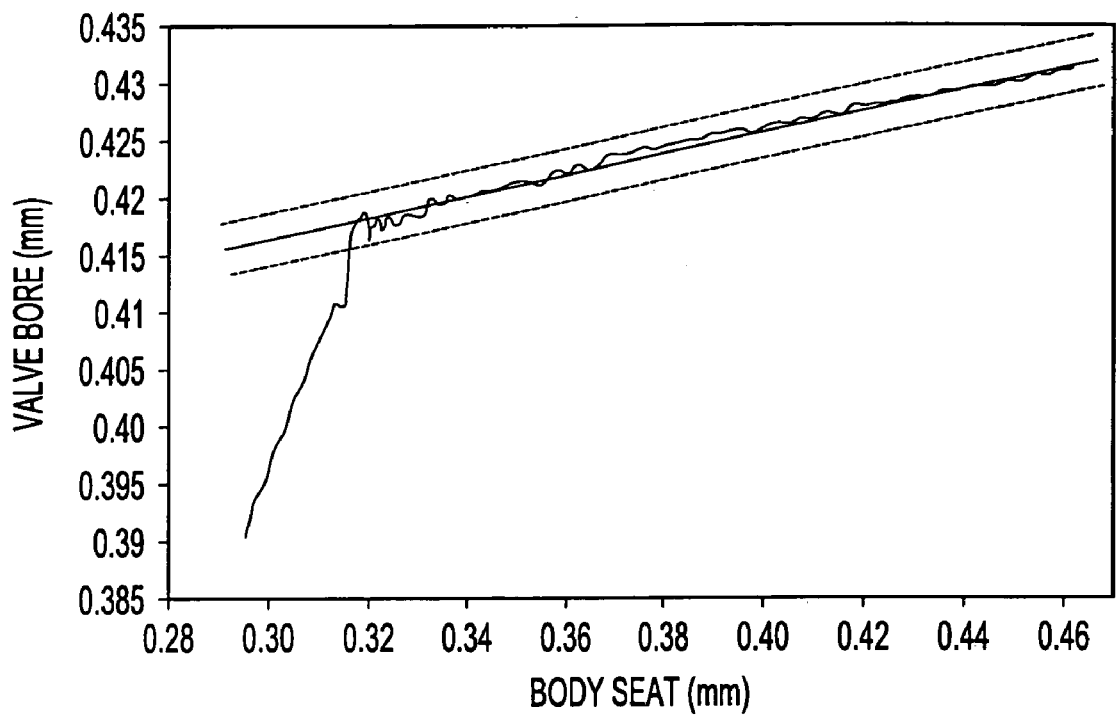
FIGS. 5 and 6 are exemplary plots that graphically depict surface profile assessments in accordance with the method shown in FIG. 4.
Figure 6:
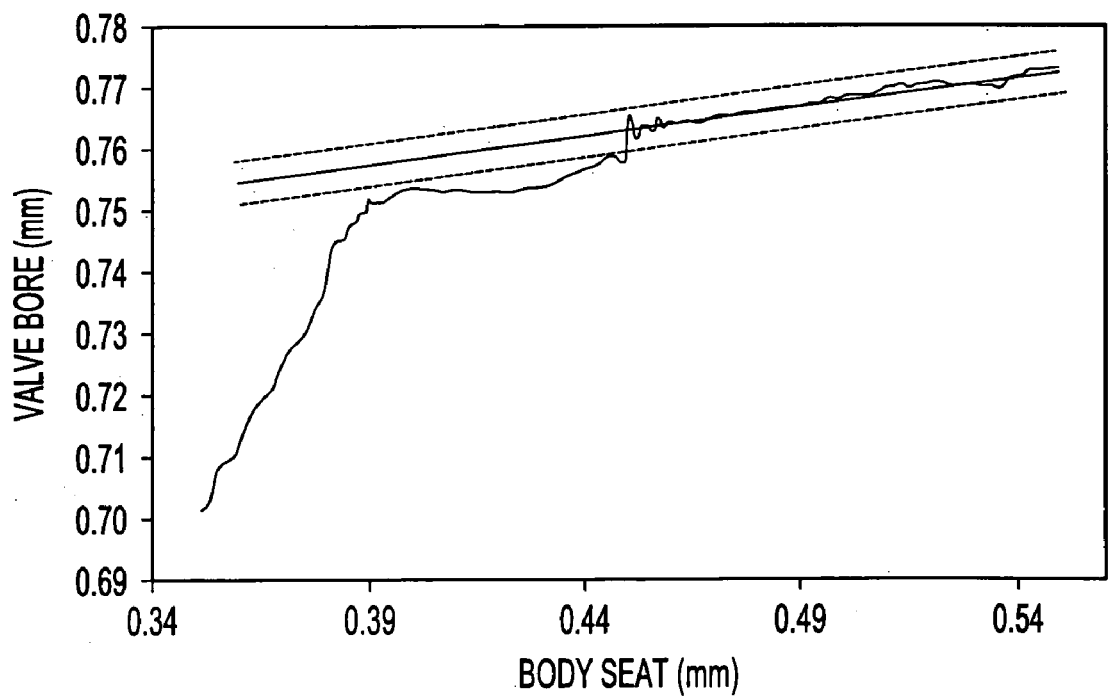

Referring to FIGS. 5 and 6, two graphical representations of surface profile assessments in accordance with the method of FIG. 4 are shown. More specifically, FIGS. 5 and 6 show assessments of two exemplary valve bore surfaces. In these figures, the vertical axis is the height of a valve bore surface and the horizontal axis is the height of the seat surface. The surface profile is depicted by the solid curved line. The "best fit" regression line is represented by the solid straight line. The tolerance limits for the regression line are represented by the dashed straight lines disposed parallel to and spaced apart from the regression line.

In FIG. 5, a surface profile of an acceptable fuel injector assembly is shown. In this profile, the seat surface data points starting at 0.32 mm are used to assess the quality of the surface. More particularly, all the data points above 0.32 mm are within the upper and lower tolerance limits. As such, this profile is indicative of the absence of significant surface defects near the boundary along the seat surface.

In FIG. 6, a surface profile of an unacceptable fuel injector assembly is shown. In this profile, the seat surface data points starting at 0.39 mm are used to assess the quality of the surface. From 0.39 mm to approximately 0.44 mm the data points are outside the lower tolerance limit while the data points above approximately 0.44 mm the data points are within the upper and lower tolerance limits. As such, this profile is indicative of the presence of significant surface defects, such as pitting, chipping, gouging, or improper machining of the seat surface.

The method of the present invention may be used to accurately assess the quality of the valve sealing region of a fuel injector assembly without the need for subjective visual analyses. In addition, the method of the present invention may be used to more accurately accept or reject a fuel injector assembly and permits prompt corrective actions to be taken to improve process yield and reduce scrap, remanufacturing, and warranty costs.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of assessing a profile of a surface of a fuel injector assembly, the method comprising:
   measuring a height of the surface over a predetermined distance with a surface profiling instrument to obtain a set of data points;
   selecting a subset of the set of data points that includes a predetermined number of consecutive data points;
   fitting a regression line to the subset;
   establishing a tolerance range for the regression line; and
   determining and communicating whether all members of the subset are within the tolerance range.

2. The method of claim 1 wherein the surface profiling instrument is a profilometer.

3. The method of claim 1 wherein the surface is a seat surface of the fuel injector assembly, the seat surface being contacted by a valve of the fuel injector assembly when the valve is in a second position.

4. The method of claim 1 wherein the surface is a valve bore surface of the fuel injector assembly.

5. The method of claim 1 wherein the tolerance range is bilateral.

6. The method of claim 1 further comprising the step of generating an acceptance signal if all members of the subset are within the tolerance range.

7. The method of claim 1 further comprising the step of generating a reject signal if any member of the subset is outside the tolerance range.

8. A method of assessing a surface profile of a fuel injector assembly, the fuel injector assembly including a valve bore having a valve bore surface and a seat surface disposed proximate the valve bore surface, and a valve disposed in the valve bore, the valve contacting the seat surface when in a first position and being spaced apart from the seat surface when in a second position, the method comprising:
   measuring a height of the seat surface over a first predetermined distance with a surface profiling instrument to obtain a first set of data points;
   measuring a height of the valve bore surface over a second predetermined distance with the surface profiling instrument to obtain a second set of data points;
   selecting a first subset from the first set of data points that includes a predetermined number of consecutive data points;
   selecting a second subset from the second set of data points;
   fitting a first regression line to the first subset;
   fitting a second regression line to the second subset;
   establishing a first tolerance range for the first regression line;
   establishing a second tolerance range for the second regression line;
   determining whether the first subset is within the first tolerance range;
   determining whether the second subset is within the second tolerance range; and
   communicating whether the first and second subsets are within the first and second tolerance ranges, respectively.

9. The method of claim 8 wherein the first set of data points further comprises a plurality of sequential data points measured along the seat surface in a first direction extending perpendicular to a boundary formed where the seat surface and the valve bore surface intersect.

10. The method of claim 8 wherein the second set of data points further comprises a plurality of sequential data points measured along the valve bore surface in a second direction extending perpendicular to a boundary formed where the seat surface and the valve bore surface intersect.

11. The method of claim 8 wherein the first subset includes a plurality of sequential data points positioned at least a first distance from a boundary formed where the seat surface and the valve bore surface intersect.

12. The method of claim 8 wherein the second subset includes a plurality of sequential data points positioned at least a second distance from a boundary formed where the seat surface and the valve bore surface intersect.

13. The method of claim 8 wherein the first and second subsets include the same number of data points.

14. The method of claim 8 wherein the first subset includes more data points than the second subset to predict whether the valve seals against the seal surface when in the second position.

15. The method of claim 8 wherein the surface profiling instrument is an optical profilometer.

16. The method of claim 8 wherein the first and second tolerance ranges are bilateral tolerance limits.

17. The method of claim 8 further comprising the step of generating an acceptance signal if all members of the first and second subsets are within the first and second tolerance ranges, respectively.

18. A method of predicting valve leakage in a fuel injector assembly, the fuel injector assembly including a valve bore having a valve bore surface and a seat surface disposed proximate the valve bore surface, and a valve disposed in the valve bore, the valve contacting the seat surface when in a first position and being spaced apart from the seat surface when in a second position, the valve bore surface and seat surface defining a boundary where they intersect, the method comprising:
   measuring the seat surface over a first predetermined distance with a surface profiling instrument to obtain a first set of data points;
   measuring the valve bore surface over a second predetermined distance with the surface profiling instrument to obtain a second set of data points;
   selecting first and second subsets from the first and second sets of data points, respectively;
   fitting first and second regression lines to the first and second subsets, respectively;
   establishing a first tolerance range for the first regression line;
   selecting a plurality of sequential data points from the first set of data points;
   determining whether the plurality of sequential data points are within the first tolerance range; and
   generating a signal indicative of valve leakage if any member of the plurality of sequential data points is outside the first tolerance range.

19. The method of claim 18 further comprising:
   establishing a second tolerance range for the second regression line;
   selecting a second plurality of sequential data points from the second set of data points;
   determining whether the second plurality of sequential data points are within the second tolerance range; and
   generating a signal indicative of valve leakage if any member of the second plurality of sequential data points is outside the second tolerance range.

20. The method of claim 18 wherein the first predetermined distance is different than the second predetermined distance.

* * * * *